United States Patent [19]

McConnell et al.

[11] Patent Number: 4,708,510
[45] Date of Patent: Nov. 24, 1987

[54] BALL JOINT COUPLING

[76] Inventors: Bernard E. McConnell, Rte. 2, Box 87; Thomas E. McConnell, Rte. 5, Box 2205, both of Greenville, Tex. 75401

[21] Appl. No.: 853,209
[22] Filed: Apr. 17, 1986
[51] Int. Cl.⁴ ............................................. F16C 3/00
[52] U.S. Cl. ...................................... 403/90; 403/137
[58] Field of Search .................. 403/90, 137, 76, 77, 403/115; 248/181

[56] References Cited

U.S. PATENT DOCUMENTS

| | | | |
|---|---|---|---|
| 654,051 | 7/1900 | Brown et al. | 248/181 |
| 807,857 | 12/1905 | Menberg | 403/77 |
| 2,670,228 | 2/1954 | Pagliuso | 287/87 |
| 2,673,054 | 3/1954 | Slavik | 403/90 X |
| 2,736,580 | 2/1956 | Botcker | 248/181 X |
| 2,752,116 | 6/1956 | Minnis | 248/181 |
| 3,198,408 | 8/1965 | Benner | 223/66 |
| 3,240,516 | 3/1966 | Barish | 287/12 |
| 3,632,073 | 1/1972 | Nakatani | 248/169 |
| 3,675,953 | 7/1972 | Glatz | 403/90 |
| 4,402,481 | 9/1983 | Sasaki | 248/276 |
| 4,412,635 | 11/1983 | Bateman | 403/115 X |
| 4,491,435 | 1/1985 | Meier | 403/55 |

Primary Examiner—Andrew V. Kundrat
Attorney, Agent, or Firm—Glaser, Griggs & Schwartz

[57] ABSTRACT

A ball joint coupling assembly permits universal movement and positioning of an object with respect to a vertical support shaft. Quick release/lock action is provided by a ball joint assembly having a housing in which a ball and piston are movably coupled. The ball is captured between annular jaw portions of the housing and piston, with locking action being provided by gripping engagement of the piston jaw portion and the housing jaw portion. The ball member is gripped in line-contact, compressive engagement by the annular edges of the piston jaw and housing jaw on opposite sides of the ball. The piston is constrained for axial movement within the housing with locking engagement and release being effected by rotation of a threaded actuator shaft.

6 Claims, 7 Drawing Figures

BALL JOINT COUPLING

FIELD OF THE INVENTION

This invention relates generally to the art of universal positioning devices, and in particular to a ball joint clamp assembly for selectively positioning surgical support apparatus onto or about an operating table.

BACKGROUND OF THE INVENTION

In the performance of orthopedic surgery and related procedures directed to the leg, foot and ankle, it is often necessary to support the leg and foot in a fixed, elevated position during the procedure, and also to vary the limb's orientation from time to time. In some cases, operating room personnel manually support the leg and foot and change the support position upon request. The use of operating room personnel to support a patient during a surgical procedure is sometimes unsatisfactory in that the assistant may tire and find it necessary to change position at some critical or otherwise inconvenient time. Additionally, pillows and other padded devices have been used. Such devices may obstruct the performance of surgery or related procedures and usually cannot provide overload support for slings, braces, hooks and the like.

Accordingly, various mechanical devices have been constructed and utilized for supporting and positioning body portions including limbs during the performance of surgery on a portion of a limb itself or a connecting joint. Such mechanical devices are adapted for attachment to an operating table or a free standing platform and generally include surgical support apparatus overlying the sterile zone of the operating table. Such equipment may be clamped onto a side rail of the operating table and is released and moved about from time to time as required by the surgical procedure. Free standing support equipment is not in widespread use for orthopedic procedures because of the stability requirements of such procedures.

DESCRIPTION OF THE PRIOR ART

Certain positioning equipment must be manually released from time to time to allow repositioning of support devices such as retainers, slings and hooks which are supported above the sterile operating zone. It will be appreciated that in such surgical procedures, time is of the essence, and delays associated with adjustment of support equipment are unwanted. Moreover, during certain procedures, it may be desirable to impose or change a biasing force on a supported body portion or limb which is undergoing a surgical procedure.

Accordingly, there is considerable interest in providing a coupling device which permits a body portion or limb such as the patient's foot, ankle and leg to be retained in a stable, predetermined position throughout a surgical procedure, yet permits the surgeon to easily and quickly change the orientation of the body portion to gain better access as desired.

SUMMARY OF THE INVENTION

The present invention provides a ball joint coupling assembly which permits universal movement and positioning of an object with respect to a vertical support shaft. The coupling assembly is particularly well suited for use in combination with an operating table for supporting a patient's limb during the performance of surgical procedures, and is quickly and easily adjusted to accomodate a wide range of support positions.

In the preferred embodiment, a universal ball joint assembly includes a housing in which a ball and piston are movably coupled. A support arm attached to the ball projects out of the housing, and the ball is captured between annular jaw portions of the housing and piston. Locking action is provided by gripping engagement of the piston annular jaw portion and the housing annular jaw portion. That is, the ball member is compressed by the annular edge of the piston jaw and by the annular edge of the housing jaw. This is line-contact, compression engagement on opposite sides of the ball. Locking pressure is increased and the desired position is secured by moving the piston member toward the housing jaw, and gripping engagement is released by moving the piston member away from the housing jaw.

The piston member is displaced axially in response to turning movement of a threaded actuator shaft. An intermediate portion of the actuator shaft is threaded in engagement with the housing, and the opposite end of the actuator shaft is terminated with a spherical bearing which is lodged within a cavity in the piston. According to this arrangement, the piston member does not rotate, but instead is displaced axially, either inwardly or outwardly, in response to turning movement of the actuator shaft. This provides positive gripping engagement and immediate release.

The features and advantages of the present invention will be further appreciated by those skilled in the art upon reading the detailed description which follows with reference to the accompanying drawings.

DETAILED DESCRIPTION OF THE PREFERRED EMBODIMENT

Figure 1:
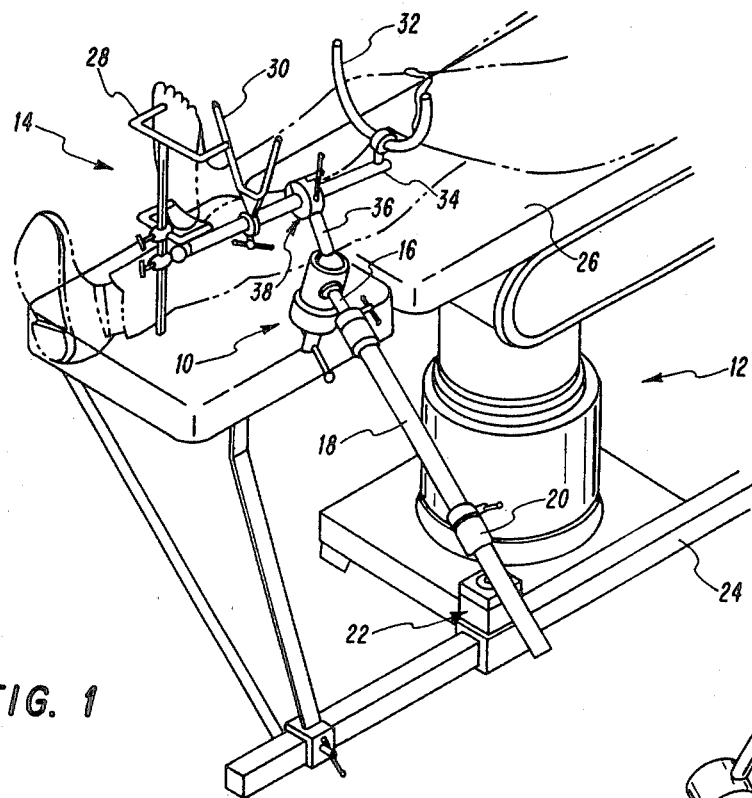
FIG. 1 is a perspective view of the ball joint coupling assembly of the present invention shown functionally connected to a conventional operating table and to a foot/leg device.

In the description which follows, like parts are indicated throughout the specification and drawings with the same reference numerals, respectively. The drawings are not necessarily to scale and certain parts have been exaggerated to better illustrate details of the present invention.

Turning now to the drawings, and with reference to FIG. 1, the ball joint coupling assembly of the present invention is indicated generally by the reference numeral 10. In this Figure, the ball joint coupling assembly is shown functionally interposed between an operating table 12 and a foot and lower leg retaining assembly 14. In this arrangement, the ball joint coupling assembly is attached to a support shaft 16 which is telescopically extendable from a tubular section 18. The tubular section 18 is received within an adjustable collar 20. The collar 20 is connected to a positioning clamp assembly 22, which is mounted for a sliding movement along a lower support bar 24. The support bar 24 is suspended below and laterally offset with respect to the patient support surface 26 of the operating table 12.

In the foregoing support arrangement, the foot/leg retaining assembly maintains a patient's foot and lower leg (shown in phantom) in a predetermined elevated position and orientation for an indefinite period of time during which surgical procedures may be performed in the general area of the patient's foot/ankle/leg. It can be seen that the elevation of the foot/leg retaining assembly, along with its lateral location with respect to the patient support surface, is generally established by extending and retracting the telescoping support shaft 16, and by adjusting the inclination of the tubular section 18 relative to the lower support bar 24. Once the general elevation and lateral location for the foot/leg support assembly has been established, further positional adjustments relative to that initial position are carried out by releasing the ball joint coupling assembly 10 and locking it after the desired position has been established.

The foot and lower leg retaining assembly 14 includes a foot retaining bracket 28, a V-shaped ankle retainer 30 and U-shaped leg retainer 32 which are secured at spaced locations along a support rod 34. The ball joint assembly 10 includes a coupling arm 36 which is releasably attached to the support rod 34 by a clamp 38. According to this arrangement, the patient's leg, ankle and foot are supported at a predetermined elevation, and can be flexed about the knee, in such a manner that the following ankle movements can be accomodated during the procedure: varus, valgus, plantiplexion and dorsiflexion. That is, it is necessary to maintain the foot and lower leg at a position which is elevated with respect to the patient support surface 26 of the operating table, while applying one or more of the foregoing forces, for example to expose and overcome a fracture. The ball joint coupling assembly 10 is releasable to permit appropriate movements of the patient's leg, including rotation of the leg and flexing of the lower leg relative to the knee.

Figure 2:
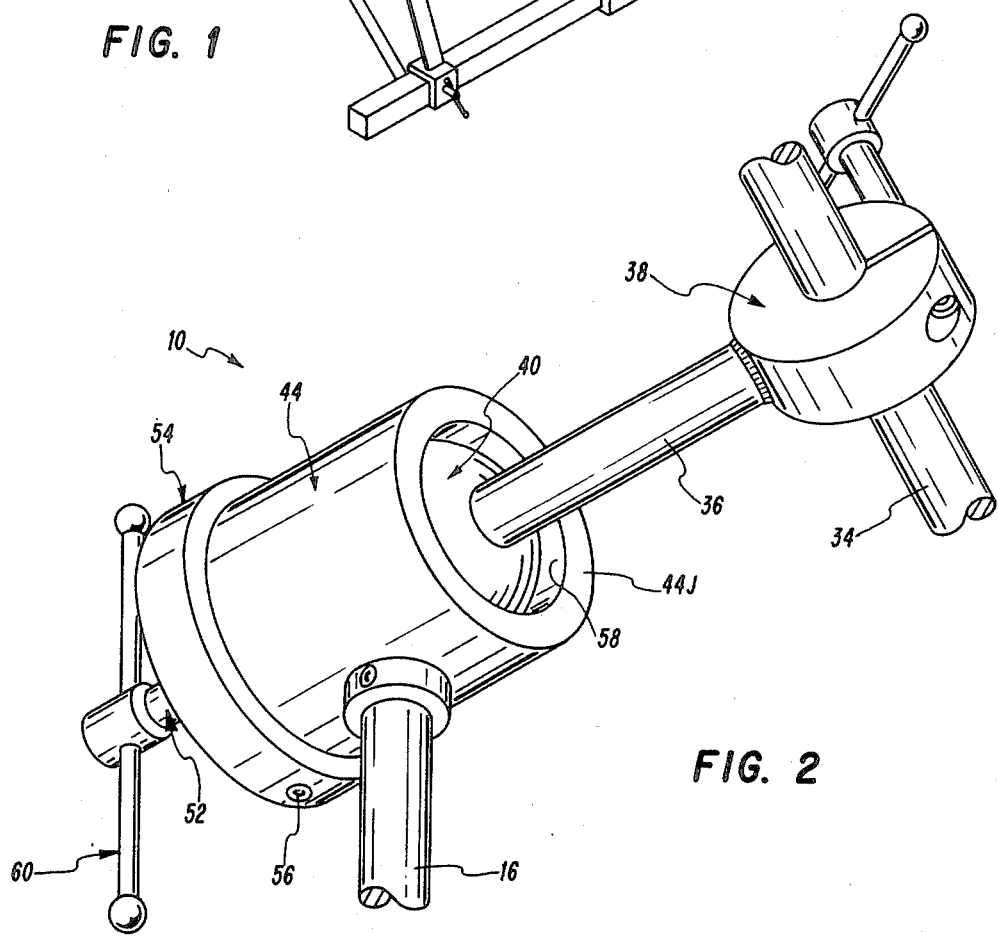
FIG. 2 is a perspective view, partially broken away, showing the details of the ball joint coupling assembly of FIG. 1.
Figure 3:
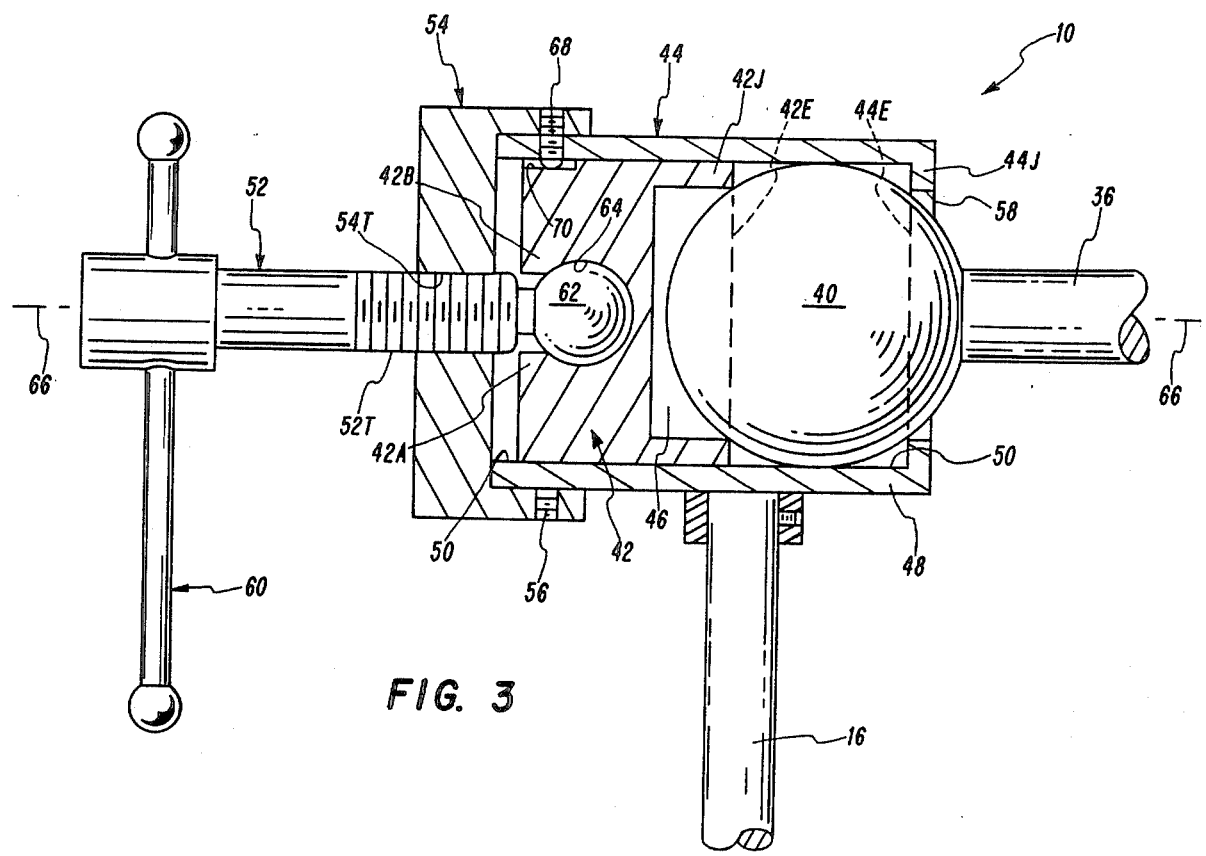
FIG. 3 is a side elevational view, partly in section, of the ball joint coupling assembly.
Figure 5A:
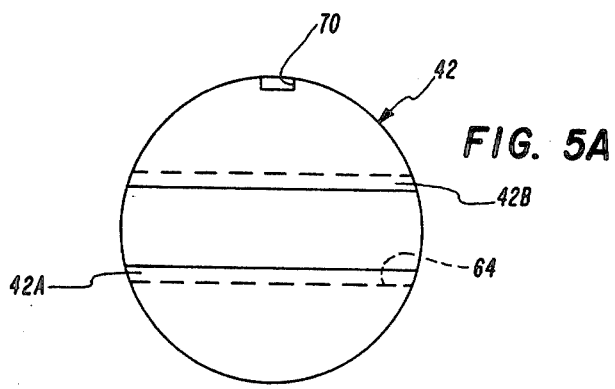
FIG. 5A is a left side elevational view thereof.
Figure 5:
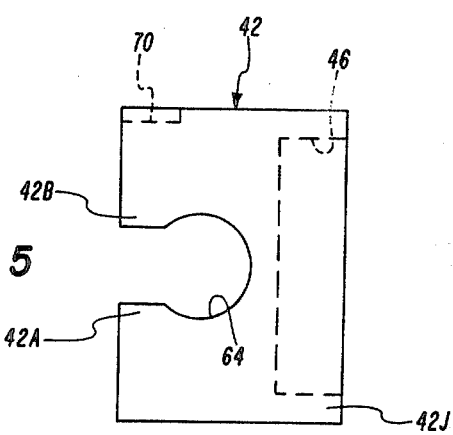
FIG. 5 is a front elevational view of the piston member shown in FIG. 3.
Figure 5B:
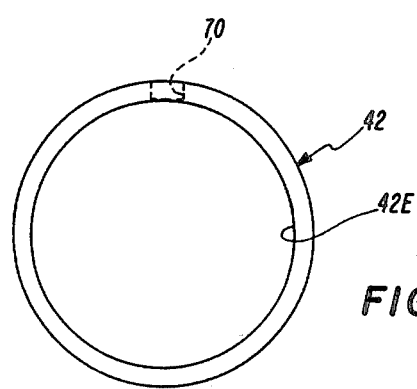
FIG. 5B is a right side elevational view thereof.

Referring now to FIGS. 1, 2 and 3, universal positioning movement of the coupling assembly 10 is made possible by a ball joint 40 which is releasably compressed between a piston 42 and housing 44. In particular, the ball 40 is gripped on one side by the annular edge 42E of a cylindrical jaw portion 42J of the piston 42 and on the opposite side by an annular edge 44E of annular jaw portion 44J.

The piston 42 is a cylindrical block in which a large bore 46 is formed on one end in alignment with its cylindrical axis. The cylindrical sidewall portion defines the annular piston jaw 42J. According to this arrangement, a portion of the ball 40 is received within the bore 46, with the ball member being engaged by the annular edge 42E of the piston jaw 42J.

The coupling housing 44 has a cylindrical sidewall 48 enclosing a coupling chamber 50 in which the piston 42 and the ball 40 are slidably received. According to this arrangement, the ball 40 is captured between the annular jaw portions 42J and 44J of the piston and housing, respectively. Locking action is provided by compressive, gripping engagement of the annular edge portions 42E and 44E. The piston jaw and housing jaw provide line-contact, compressive engagement on opposite sides of the ball 40.

Figure 4:
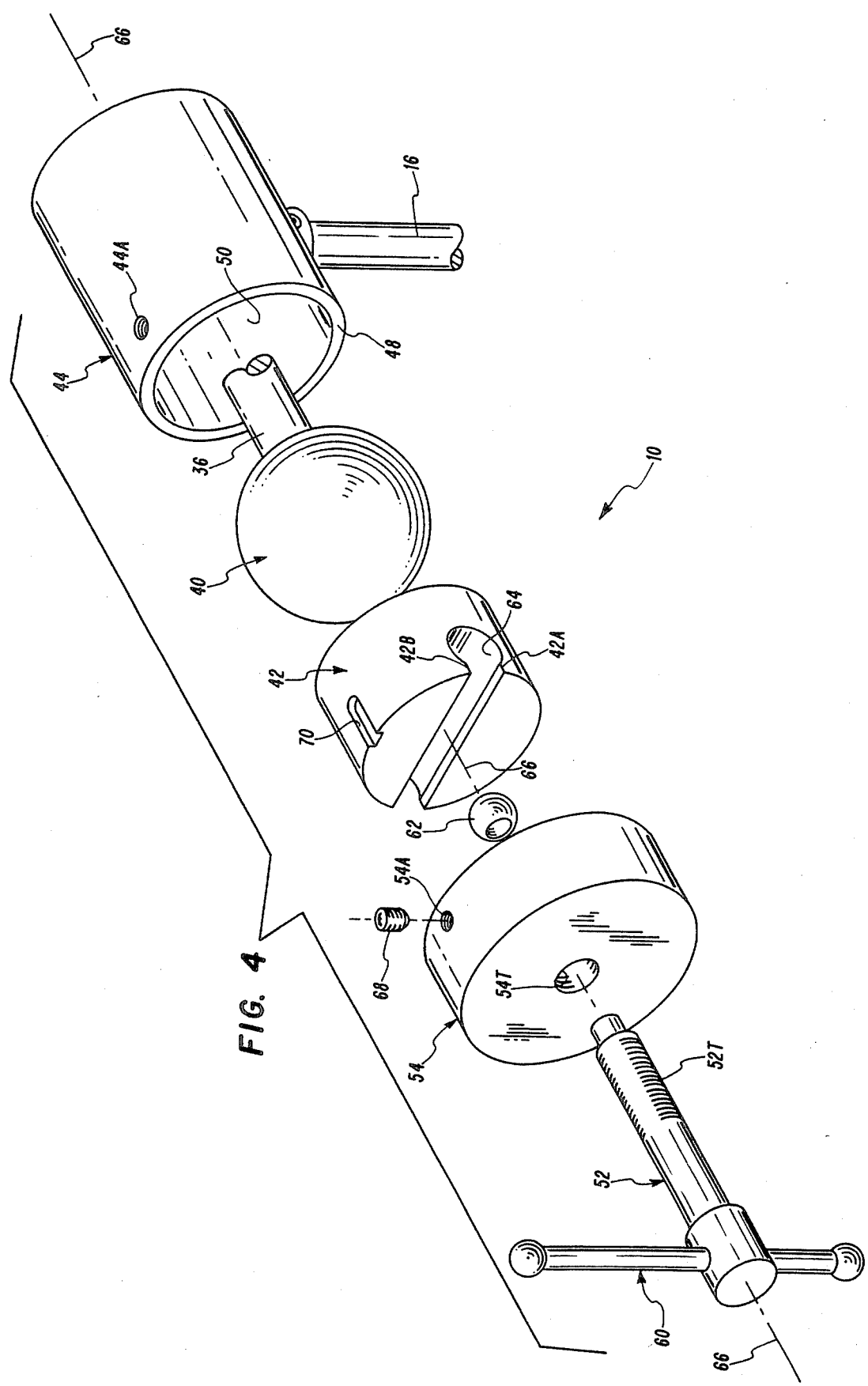
FIG. 4 is an exploded perspective view of the ball joint coupling assembly.

The piston 42 is displaced axially in response to turning movement of a threaded actuator shaft 52. Referring to FIGS. 3 and 4, the piston 42 and ball 40 are confined within the coupling chamber 50 by an end cap 54 which is secured to the housing sidewall 48 by a set screw 56. The opposite end of the housing 44 is partially blocked by the annular jaw portion 44J. The inside diameter of the housing jaw portion 44J defines a circular swivel opening 58 through which the coupling arm 36 and a portion of the ball 40 project. An intermediate shaft portion 52T is threaded and is received within a threaded opening 54T formed in the cap 54. A handle 60 is attached to the external end portion of the actuator shaft 52, and the internal end portion is terminated by a spherical bearing 62.

Referring now to FIGS. 3, 4, 5, 5A and 5B, a cylindrical slot 64 is formed within the body of piston 42 and extends at a right angle with respect to the longitudinal axis 66 of the piston 42. The diameter of the cylindrical slot 64 is appropriately sized to receive the spherical bearing member 62 and to permit it to rotate freely within the slot in response to rotation of actuator shaft 52. Withdrawal of the spherical bearing member 62 out of the slot along the axis 66 is prevented by piston shoulder portions 42A, 42B which permit entry of the actuator shaft 52, but which block axial withdrawal of the spherical bearing 62.

The piston 42 is displaced axially in response to turning movement of the actuator shaft 52. According to this arrangement, the piston 42 does not rotate, but instead is displaced axially, either inwardly or outwardly, in response to turning movement of the actuator shaft. As a result of axial movement rather than rotation of the piston, positive locking action and immediate release are obtained by only a fractional rotation of the actuator shaft 52. Quick engagement and disengagement is made possible by the line contact engagement of the piston annular edge portion 42E.

Although axial displacement of the piston 42 could be produced by rotation of the piston 42 along a path of threaded engagement with the inside diameter of the ball joint housing, more turning movement would be required per unit of axial displacement of the piston 42 as compared with the direct extension and retraction of the piston by cooperation of the spherical bearing member and rotation of the actuator shaft 52. According to an important aspect of the preferred embodiment, rotation of the piston 42 is inhibited by a key 68 which is slidably received within an axial slot 70 formed in the outer surface of the piston 42. In this arrangement, the key 68 is a set screw which is engaged in threaded openings 54A, 44A of cap 54 and housing 44, respectively, with its end portion being received within the axial slot 70. Axial displacement of the piston 42 is thereby allowed, but rotation is prevented.

Thus, piston 42 is constrained to slide axially within housing chamber 50 in response to rotation of actuator shaft 52. Referring again to FIGS. 1 and 2, it will be seen upon a slight counter-clockwise rotation of actuator shaft 52 that the coupling ball 40 is released for universal rotation movement within housing cavity 50 with its rotational range being limited only by engagement of coupling arm 36 against housing jaw 44J. Any intermediate position can be quickly established and set by clockwise tightening rotation of the actuator shaft 52. Thus, the lateral position and angular orientation of the foot/leg support assembly 14 can be adjusted and "fine tuned" at will during a surgical procedure. Once established, the desired position of the limb can be maintained indefinitely.

Although the invention has been described with reference to a specific embodiment, and with reference to a particular application, the foregoing description is not intended to be construed in a limiting sense. Various modifications of the disclosed embodiment as well as alternative applications of the invention will be suggested to persons skilled in the art by the foregoing specification and illustrations. For example, the ball joint coupling assembly of the present invention can be used in combination with photographic equipment and stage lighting equipment in which universal positioning of a component is desirable. It is therefore contemplated that the appended claims will cover any such modifications or embodiments that fall within the true scope of the invention.

What is claimed is:

1. A ball joint coupling assembly comprising, in combination:
    a housing having a bore defining a coupling chamber and having an annular jaw defining a pivot opening;
    a ball member received in said housing bore and engaging the circumferential edge of said housing annular jaw substantially in line contact, said ball member having a support arm projecting through said pivot opening;
    a piston received in said housing bore, and piston having a pocket for receiving a bearing member and an annular jaw engaging said ball member substantially in line contact; and,
    means coupled to said piston for extending said piston through said coupling chamber into engagement with said ball joint for compressing said ball joint between said piston jaw and said housing jaw, and for retracting said piston through said coupling chamber for disengaging said piston jaw from said ball joint;
    said extending and retracting means including a ball bearing member secured for rotation within said piston pocket and an actuator shaft coupled to said bearing member, said actuator shaft projecting out of said piston pocket and out of said housing; said actuator shaft being mounted on said housing for rotational movement relative thereto.

2. A ball joint assembly as defined in claim 1, said actuator shaft having a threaded portion, and said housing having a cap with a threaded passage, the threaded portion of said shaft being engaged with the threaded passage of said housing cap.

3. A ball joint assembly as defined in claim 1, said piston having a keyway slot formed in its exterior surface, said combination including a key attached to said housing extending into said piston keyway slot.

4. A ball joint coupling assembly as defined in claim 1,
    said housing comprising a cylindrical sidewall and said coupling being a cylindrical bore formed within the cylindrical sidewall;
    said housing jaw comprising a radially projecting, annular shoulder portion of said sidewall.

5. A ball joint coupling assembly as defined in claim 1, said piston being a cylindrical block having an open bore formed along its longitudinal axis, said block having an axially extending, cylindrical sidewall portion defining said portion annular jaw.

6. A ball joint coupling assembly comprising, in combination:
    a housing having a bore defining a coupling chamber and having an annular jaw defining a pivot opening;
    a ball member received in said housing bore and engaging the circumferential edge of said housing annular jaw in line contact,
    a support arm attached to said ball member and projecting through said pivot opening;
    a piston movably disposed in said housing bore, said piston having an annular jaw and a circular edge formed on said piston jaw engaging said ball member in line contact; and,
    means coupled to said piston for moving said piston through said coupling chamber into engagement with said ball member thereby compressing said ball member between the circular edge of said piston jaw and the circular edge of said housing jaw, and for retracting said piston through said coupling chamber for disengaging said piston jaw from said ball member.

* * * * *